(12) United States Patent
Clark et al.

(10) Patent No.: US 8,938,644 B2
(45) Date of Patent: Jan. 20, 2015

(54) QUERY EXECUTION PLAN REVISION FOR ERROR RECOVERY

(75) Inventors: Arthur Clark, San Diego, CA (US); Douglas P. Brown, Rancho Santa Fe, CA (US); Anita Richards, San Juan Capistrano, CA (US); Donald R. Pederson, San Diego, CA (US)

(73) Assignee: Teradata US, Inc., Dayton, OH (US)

( * ) Notice: Subject to any disclaimer, the term of this patent is extended or adjusted under 35 U.S.C. 154(b) by 727 days.

(21) Appl. No.: 12/960,307

(22) Filed: Dec. 3, 2010

(65) Prior Publication Data

US 2012/0144234 A1   Jun. 7, 2012

(51) Int. Cl.
  *G06F 11/00*   (2006.01)
  *G06F 11/07*   (2006.01)
  *G06F 11/14*   (2006.01)
  *G06F 11/34*   (2006.01)

(52) U.S. Cl.
  CPC .......... *G06F 11/0727* (2013.01); *G06F 11/142* (2013.01); *G06F 11/3466* (2013.01); *G06F 11/0793* (2013.01); *G06F 11/3409* (2013.01); *G06F 11/3419* (2013.01); *G06F 2201/80* (2013.01); *G06F 2201/81* (2013.01); *G06F 2201/815* (2013.01)
  USPC ............................................ 714/16; 707/718

(58) Field of Classification Search
  None
  See application file for complete search history.

(56) References Cited

U.S. PATENT DOCUMENTS

| | | | | |
|---|---|---|---|---|
| 4,945,468 A | * | 7/1990 | Carson et al. | 726/15 |
| 5,247,664 A | * | 9/1993 | Thompson et al. | 1/1 |
| 5,590,277 A | * | 12/1996 | Fuchs et al. | 714/38.13 |
| 6,546,403 B1 | * | 4/2003 | Carlson et al. | 1/1 |
| 6,820,218 B1 | * | 11/2004 | Barga et al. | 714/17 |
| 2005/0154740 A1 | * | 7/2005 | day et al. | 707/100 |
| 2005/0177557 A1 | * | 8/2005 | Ziauddin et al. | 707/3 |
| 2006/0136396 A1 | * | 6/2006 | Brobst | 707/3 |
| 2008/0168312 A1 | * | 7/2008 | Banks et al. | 714/39 |
| 2008/0177694 A1 | * | 7/2008 | Chaudhuri et al. | 707/2 |
| 2009/0043745 A1 | * | 2/2009 | Barsness et al. | 707/4 |
| 2009/0094192 A1 | * | 4/2009 | Bestgen et al. | 707/2 |
| 2010/0220585 A1 | * | 9/2010 | Poulson et al. | 370/216 |
| 2010/0312776 A1 | * | 12/2010 | Burrichter et al. | 707/759 |

* cited by examiner

*Primary Examiner* — Gabriel Chu
(74) *Attorney, Agent, or Firm* — Gates & Cooper, LLP; Randy L. Campbell, Jr.

(57) ABSTRACT

A computer-implemented method, apparatus and article of manufacture for performing an automatic error recovery in a database system. Automatic error recovery is performed for a query execution plan, following errors, problems or failures that occur during execution, by automatically or manually deactivating and/or activating components, features or code paths, and then re-submitting the query execution plan for execution in the computer system.

30 Claims, 9 Drawing Sheets

ADMINISTRATOR

QUERY EXECUTION PLAN REVISION FOR ERROR RECOVERY

BACKGROUND OF THE INVENTION

1. Field of the Invention

The invention relates generally to computer-implemented database systems, and specifically, to an automatic error recovery mechanism for a database system.

2. Description of the Related Art

During the processing of queries in a database system, a substantial number of errors, problems or failures may cause the system to cancel the query. In today's environment (i.e., from a user's point of view), such failures are a constant source of frustration and delay.

Problems get reported to the vendor's customer service personnel, who investigate each instance and, for many instances, create incident reports. Such incident reports are then forwarded to the vendor's development personnel, who may take some time to respond to the incident report and resolve the customer's problem. Indeed, some incidents may not get responded to and some problems may not get resolved for extended periods of time.

Often, a workaround is available (e.g., by deactivating or activating certain components, features or code paths), but it may take a substantial period of time to communicate the workaround from the vendor to the customer, so that the workaround can be implemented. Indeed, there may be situations where the workaround could be automatically implemented by the database system itself, in a real-time environment, and without the intervention of a user, database administrator (DBA), or other personnel. Such workarounds can be used for long periods of time, even across several releases or updates of the system, thereby allowing the system to provide for better query plans (i.e., query plans that execute without faults). Moreover, workarounds could be manually or automatically disabled, once a "fix" is implemented, thereby avoiding having the components, features or code paths being deactivated or activated for long periods of time.

What is needed then, is a database system that can automatically or manually activate and/or deactivate components, features and code paths through the analysis of diagnostics, which may result in errors, problems or failures being bypassed.

The present invention provides such a system, wherein an active system management capability can resubmit a query following its execution failure, but using a different set of components, features or code paths than the previous set of components, features or code paths that resulted in the failure. Moreover, this active system management capability can be used to alert users, DBAs and other personnel, including vendor personnel, of potential problems or potential issues in components, features or code paths, and communicate ways to avoid those problems or issues.

These and other aspects of the present invention are described in more detail below.

SUMMARY OF THE INVENTION

To overcome the limitations in the prior art described above, and to overcome other limitations that will become apparent upon reading and understanding the present specification, the present invention discloses a computer-implemented method, apparatus, and article of manufacture for performing an automatic error recovery in a database system. The automatic error recovery is performed during execution of database queries in the database system. First, a query execution plan is generated for a query request, wherein the query execution plan accesses data from a database stored on the computer system. The query execution plan is then executed to access the data in the database.

Automatic error recovery is performed for the query execution plan, following errors, problems or failures that occur during the execution of the query execution plan. The automatic error recovery is performed following an analysis of diagnostics generated by the computer system. The automatic error recovery may also alert users, DBAs or other personnel to the errors, problems or failures that cause the query execution plan to stop executing.

Automatic error recovery is performed by deactivating and/or activating components, features or code paths in the computer system, and then re-submitting the query execution plan for execution in the computer system. The components, features or code paths in the computer system may be automatically or manually deactivated or activated. The specifics for deactivating or activating the specified components, features or code paths are described in more detail below.

Upon a first attempt to execute the query execution plan, a retry attempt number (RAN) is initialized. The RAN is used to determine how many times the query execution plan is retried, following errors, problems or failures, before the query execution plan is flagged as having failed.

Upon the execution of a first set of components, features or code paths, which is initiated by the execution of the query execution plan, a Unique Identifying Code (UIC) is pushed onto an Autonomic Error Recovery Stack (AERS) stored in memory. The UIC is popped from the AERS when the execution of the first set of components, features or code paths is completed successfully. Otherwise, the UIC remains at the top of the AERS.

When errors, problems or failures occur during the execution of the first set of components, features or code paths, an error code is generated and an error handler is invoked to access a table using both the UIC at the top of the AERS and the error code. The error handler retrieves one or more matching rows from the table that contain the UIC and the error code, wherein the matching rows also contain diagnostic codes, optional parameters for the diagnostic codes, and a retry order. The error handler then selects one or more of the matching rows with a retry order based on the RAN. Each of the matching rows may include a different set of diagnostic commands and optional parameters that may deactivate the first set of components, features or code paths, and/or activate a second set of components, features or code paths, in an attempt to avoid the errors, problems and failures.

The error handler also determines a maximum number of attempts (MNA) to re-submit the query execution plan, and the RAN is incremented. The query execution plan is not re-submitted when the RAN is greater than the MNA.

Otherwise, the error handler re-submits the query execution plan with the diagnostic codes and optional parameters from the selected matching row, wherein the diagnostic codes and optional parameters may deactivate the first set of components, features or code paths, and/or activate a second set of components, features or code paths, during the subsequent re-execution the query execution plan, in an attempt to avoid the errors, problems and failures.

Other features and advantages will become apparent from the description and claims that follow.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware and Software Environment

Figure 1:
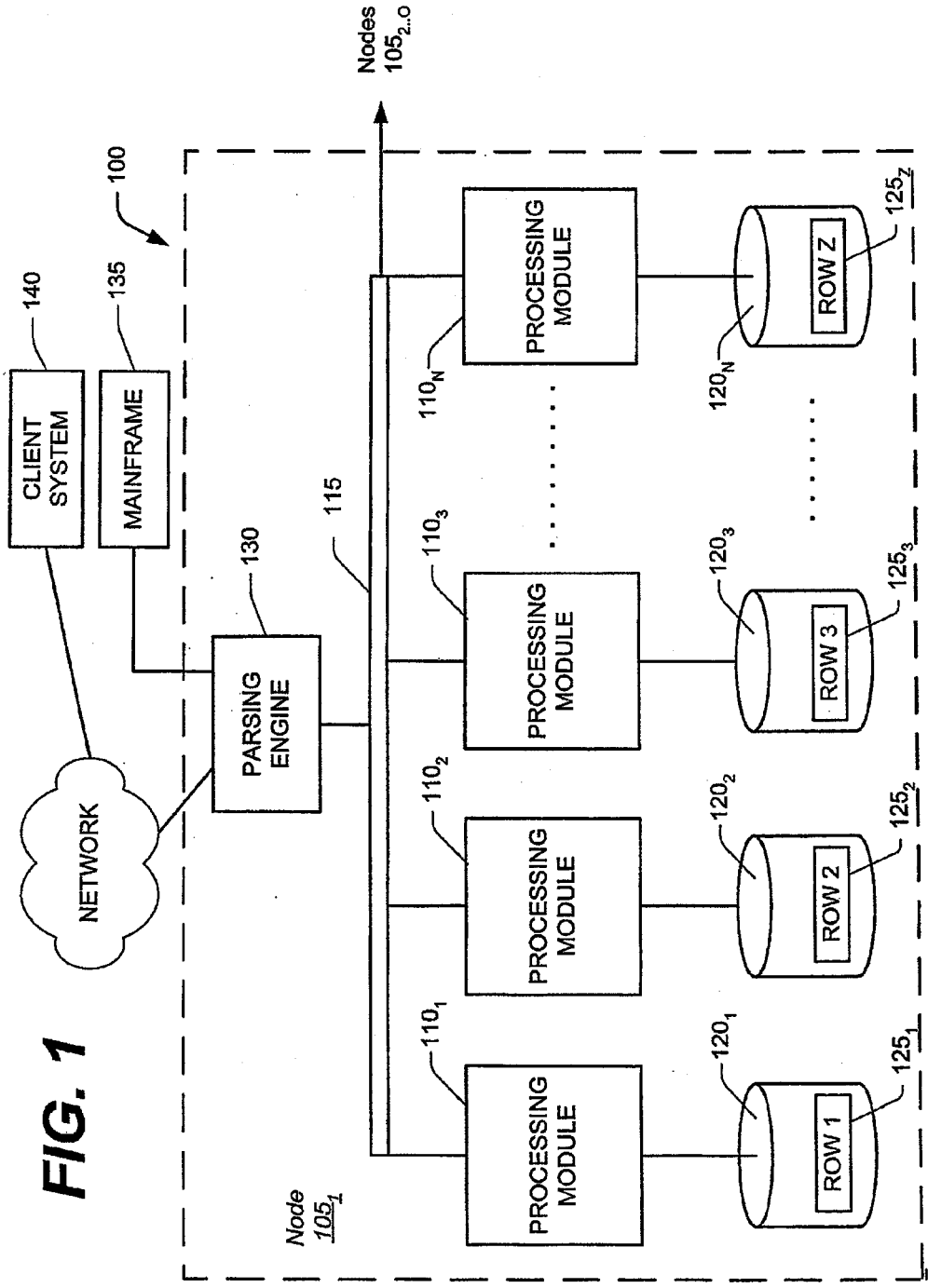
FIG. 1 is a block diagram of a node of a database system.

FIG. 1 is a schematic illustration of an exemplary hardware and software environment for the present invention. The exemplary hardware and software environment comprises a database system ("DBS") 100, such as a Teradata Active Data Warehouse (ADW) available from Teradata Corporation, that is used to manage very large databases.

The DBS 100 is comprised of one or more nodes $105_{1,2 \ldots O}$ connected by a network, interconnect or bus 115. The DBS 100 may include multiple nodes $105_{2 \ldots O}$ in addition to the node $105_1$ illustrated in FIG. 1, which are connected by extending the network 115.

Each node $105_1$ of the DBS 100 includes one or more processing modules $110_{1 \ldots N}$, connected by the network 115, that manage the storage and retrieval of data in data storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors. Each virtual processor is generally termed an Access Module Processor (AMP) in the Teradata Active Data Warehousing System.

For the case in which N virtual processors are running on an M processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data storage facilities $120_{1 \ldots N}$. Each of the data storage facilities $120_{1 \ldots N}$ includes one or more disk drives.

The system stores data in one or more tables in the data storage facilities $120_{1 \ldots N}$. The rows $125_{1 \ldots Z}$ of the tables may be stored across multiple data storage facilities $120_{1 \ldots N}$ to ensure that the system workload is distributed evenly across the processing modules $110_{1 \ldots N}$.

A Parsing Engine (PE) 130 organizes the storage of data and the distribution of table rows $125_{1 \ldots Z}$ among the processing modules $110_{1 \ldots N}$. The PE 130 also coordinates the retrieval of data from the data storage facilities $120_{1 \ldots N}$ in response to queries received from a user at a mainframe 135 or a client computer 140. The DBS 100 usually receives queries in a standard format, such as SQL.

Parsing Engine

Figure 2:
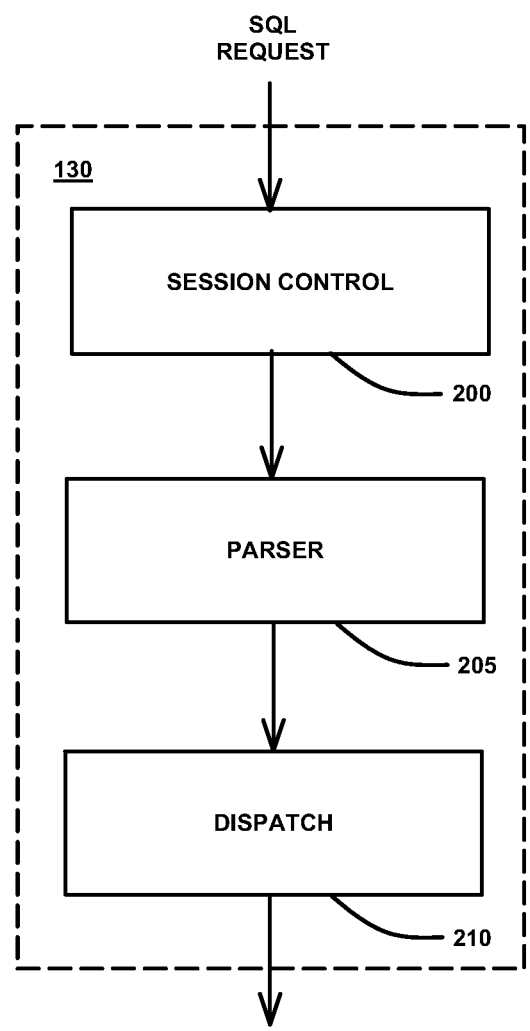
FIG. 2 is a block diagram of a parsing engine.
Figure 3:
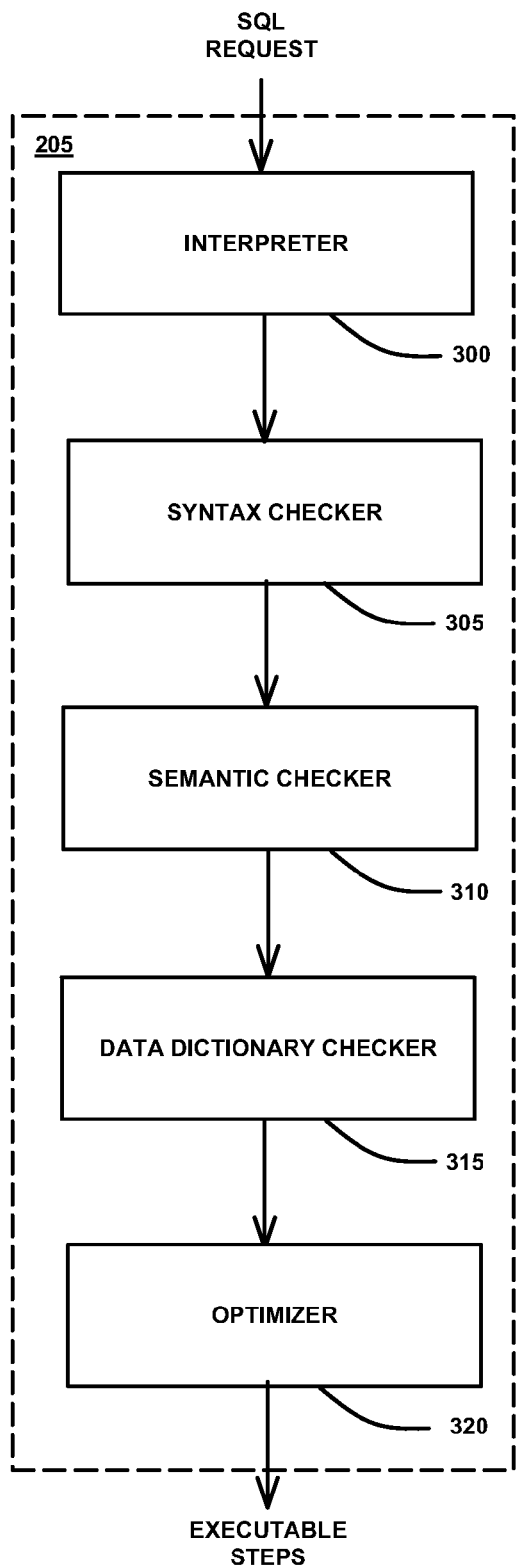
FIG. 3 is a flow chart of a parser.

FIG. 2 is a block diagram that illustrates the primary components of the PE 130, including a session control 200, a parser 205, and a dispatch function 210, while FIG. 3 is a flow chart showing the steps or functions performed by the parser 205.

As illustrated in FIG. 2, the session control 200 provides the logon and logoff function. It accepts a request for authorization to access the database, verifies it, and then either allows or disallows the access.

Once the session control 200 allows a session to begin, a user may submit an SQL request that is routed to the parser 205. As illustrated in the flowchart of FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315).

Finally, the parser 205 runs an Optimizer (block 320) that generates and selects an optimal query execution plan (e.g., the least expensive plan) comprised of one or more steps to perform the request. In one embodiment of the present invention, the Optimizer 320 includes performance information, such as actual cost information or intermediate results, when developing an optimal plan to perform the request.

Referring again to FIG. 2, once a query execution plan is selected, it is scheduled for execution by the Dispatch function 210. The Dispatch function 210 accepts performance goals for each workload as inputs and dynamically adjusts system resources, such as by allocating DBS 100 resources and controlling the flow of workloads. For example, adjusting how weights are assigned to resources modifies the way access to the CPU, disk and memory are allocated among requests. Given performance objectives for each workload and the fact that the workloads may interfere with each other's performance through competition for shared resources, the DBS 100 may find a performance setting that achieves one workload's goal but makes it difficult to achieve another workload's goal.

The performance goals for each workload will vary widely as well, and may or may not be related to their resource demands. For example, two workloads that execute the same application and DBS 100 code could have differing performance goals simply because they were submitted from different departments in an organization. Conversely, even though two workloads have similar performance objectives, they may have very different resource demands.

"Closed-Loop" Workload Management Architecture

The DBS 100 includes a "closed-loop" workload management architecture, which is capable of satisfying a set of workload-specific goals and responding to errors, problems and failures. In other words, the system is a goal-oriented workload management system capable of supporting complex workloads and capable of self-adjusting to various types of workloads, errors, problems and failures. The workload management system is generally referred to as the Teradata Active System Management (TASM).

The system's operation has four major phases: 1) assigning a set of incoming request characteristics to workload groups, assigning the workload groups to priority classes, and assigning goals (called Service Level Goals or SLGs) to the workload groups; 2) monitoring the execution of the workload; 3)

regulating (adjusting and managing) the workload flow; and 4) correlating the results of the workload and taking action to improve execution.

Execution improvement can be accomplished in several ways: 1) through performance tuning recommendations such as the creation or change in index definitions or other supplements to table data, or to recollect statistics, or other performance tuning actions, 2) through capacity planning recommendations, for example increasing system power, 3) through utilization of results to enable optimizer self-learning, 4) through recommending adjustments to SLGs of one workload to better complement the SLGs of another workload that it might be impacting, and 5) by activating and/or deactivating components, features and code paths in response to errors, problems and failures. These can be performed automatically by the DBS 100 itself, or manually by a user, DBA or other personnel.

Figure 4:
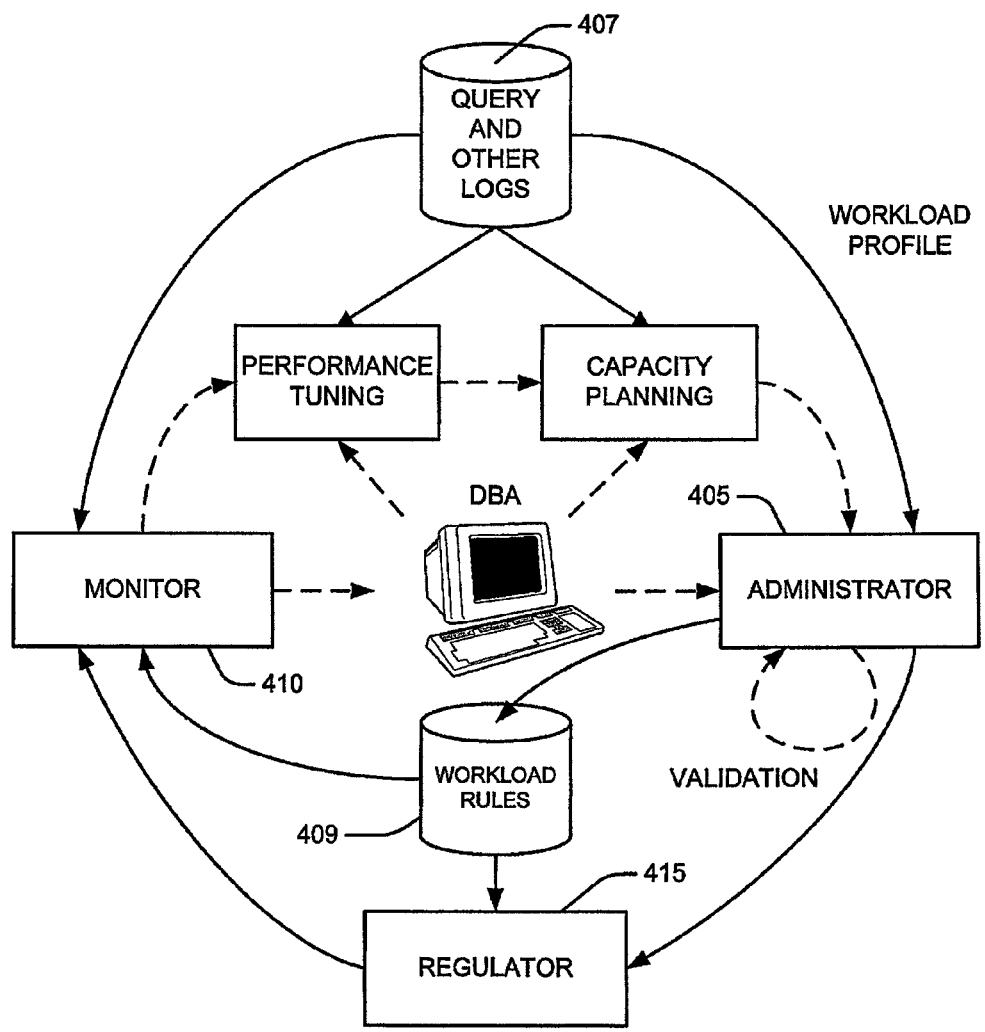
FIGS. 4-6 are block diagrams of a system for administering the workload of a database system.

The system includes the following components (illustrated in FIG. 4):

1) Administrator (block 405): This component provides a GUI to define workloads, SLGs, other workload management requirements, and to activate and/or deactivate components, features and code paths in response to errors, problems and failures. The administrator 405 accesses data in logs 407 associated with the system, including a database query log (DBQL). The administrator 405 is a primary interface for the DBA. The administrator also establishes workload rules 409, which are accessed and used by other elements of the system.

2) Monitor (block 410): This component provides a top level dashboard view, and the ability to drill down to various details of workload performance. Such data is stored in the query log and other logs 407 available to the monitor. The monitor also includes processes that initiate the execution improvement mechanisms listed above and processes that provide long term trend reporting, which may including providing execution improvement recommendations. Some of the monitor functionality may be performed by the regulator, which is described in the next paragraph.

3) Regulator (block 415): This component dynamically adjusts system settings and/or addresses execution issues, and either alerts the DBA or user to take action, for example, by communication through the monitor, which is capable of providing alerts, or through the exception log, providing a way for applications and their users to become aware of, and take action on, regulator 415 actions. Alternatively, the regulator 415 can automatically take action itself, by deferring requests or executing requests with the appropriate priority to yield the best solution given requirements defined by the administrator (block 405), or by deactivating or activating components, features and code paths in response to errors, problems and failures. The regulator 415 may also use a set of open application programming interfaces (APIs) to access and monitor these functions.

The workload management administrator (block 405), or "administrator," is responsible for determining (i.e., recommending and/or executing) the appropriate application settings. Such activities as setting weights, managing active work tasks and changes to any and all options will be automatic and taken out of the hands of the DBA. The user will be masked from all complexity involved in setting up the DBS 100.

Workload Management Administrator

Figure 5:
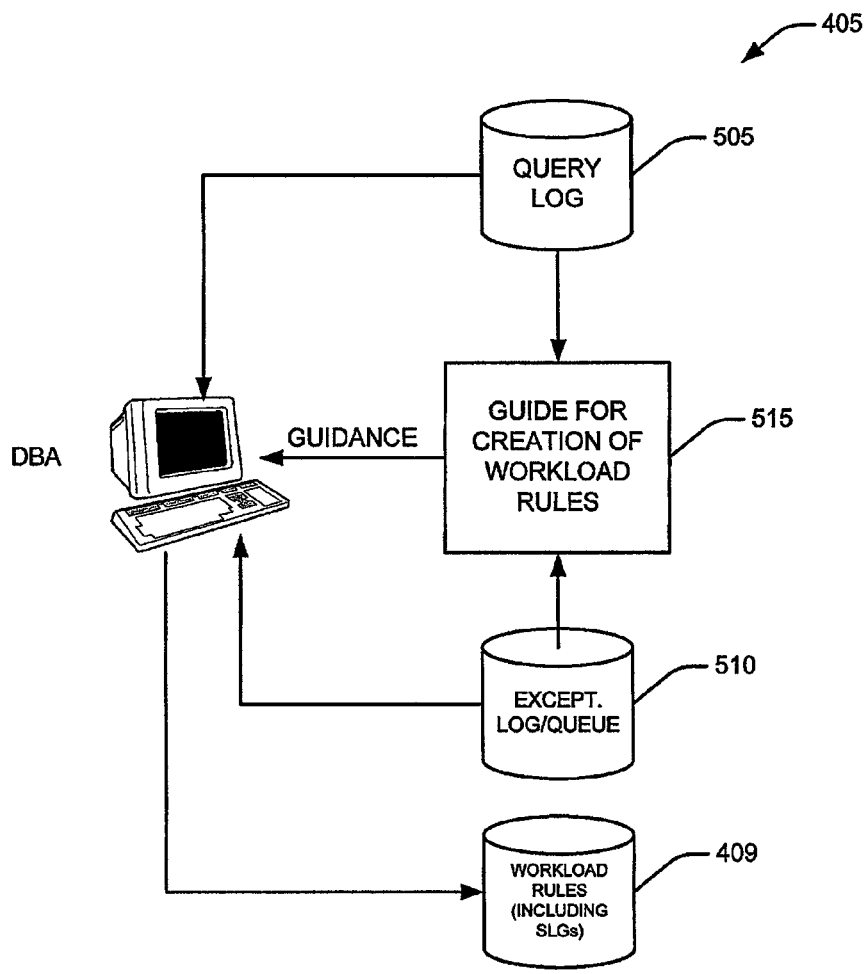

As shown in FIG. 5, the workload management administrator (block 405) allows the DBA to establish workload rules, including SLGs, which are stored in a storage facility 409, accessible to the other components of the system. The DBA has access to a query log 505, which stores the steps performed by the DBS 100 in executing a request along with database statistics associated with the various steps, and an exception log/queue 510, which contains records of the system's errors, problems and failures, as well as deviations from the SLGs established by the administrator. With these resources, the DBA can examine past performance, establish SLGs that are reasonable in light of the available system resources, and deactivate and/or activate components, features and code paths in response to errors, problems and failures. In addition, the system provides a guide for creation of workload rules 515 which guides the DBA in establishing the workload rules 409. The guide accesses the query log 505 and the exception log/queue 510 in providing its guidance to the DBA.

The administrator assists the DBA in:

a) Establishing rules for dividing requests into candidate workload groups, and creating workload group definitions. Requests with similar characteristics (users, application, table, resource requirement, etc) are assigned to the same workload group. The system supports the possibility of having more than one workload group with similar system response requirements.

b) Refining the workload group definitions and defining SLGs for each workload group. The system provides guidance to the DBA for response time and/or arrival rate threshold setting by summarizing response time and arrival rate history per workload group definition versus resource utilization levels, which it extracts from the query log(from data stored by the regulator), allowing the DBA to know the current response time and arrival rate patterns. The DBA can then cross-compare those patterns to satisfaction levels or business requirements, if known, to derive an appropriate response time and arrival rate threshold setting, i.e., an appropriate SLG. After the administrator specifies the SLGs, the system automatically generates the appropriate resource allocation settings. These SLG requirements are distributed to the rest of the system as workload rules.

c) Optionally, establishing priority classes and assigning workload groups to the classes. Workload groups with similar performance requirements are assigned to the same class.

d) Providing proactive feedback (i.e., validation) to the DBA regarding the workload groups and their SLG assignments prior to execution to better assure that the current assignments can be met, i.e., that the SLG assignments as defined and potentially modified by the DBA represent realistic goals. The DBA has the option to refine workload group definitions and SLG assignments as a result of that feedback.

Internal Monitoring and Regulating

Figure 6:
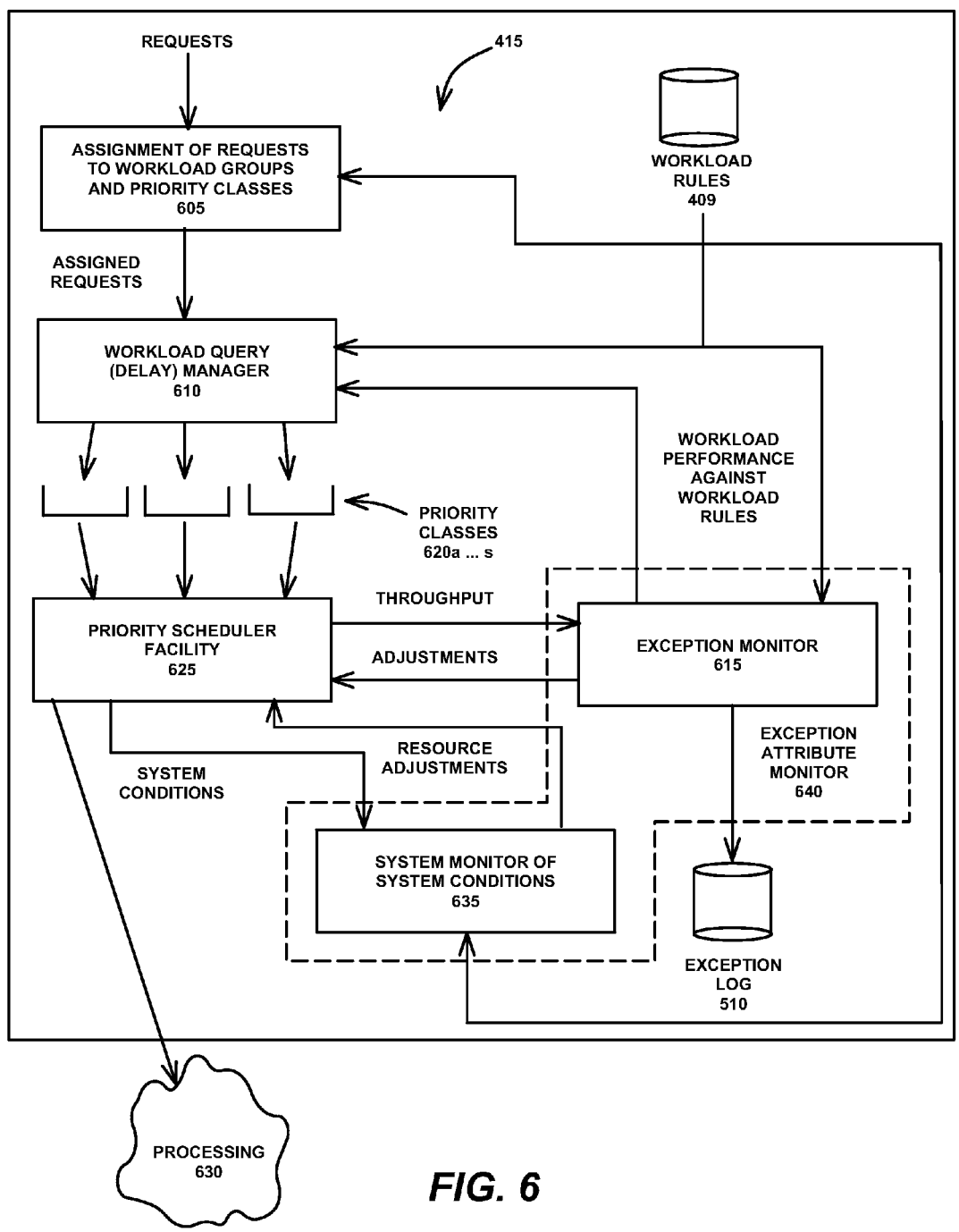

The internal monitoring and regulating component (regulator 415), illustrated in more detail in FIG. 6, accomplishes its objective by dynamically monitoring the workload characteristics (defined by the administrator) using workload rules or other heuristics based on past and current performance of the system that guide feedback mechanisms. It does this before the request begins execution and at periodic intervals during query execution. Prior to query execution, an incoming request is examined to determine in which workload group it belongs, based on criteria as described in more detail below.

Query execution requests currently being executed are monitored to determine if errors, problems or failures have occurred. If so, actions can be taken to activate and/or deactivate components, features and code paths in response to the errors, problems and failures. In addition, query execution requests may be aborted, and/or alerts may be generated and logged, with the potential for follow-up actions as a result of detecting these situations.

As shown in FIG. 6, the regulator 415 receives one or more requests, each of which is assigned by an assignment process (block 605) to a workload group and, optionally, a priority class, in accordance with the workload rules 409. The assigned requests are passed to a workload query (delay) manager 610. The regulator 415 includes an exception monitor 615 for detecting workload exceptions, which are recorded in a log 510.

In general, the workload query (delay) manager 610 monitors the workload performance from the exception monitor 615, as compared to the workload rules 409, and either allows the request to be executed immediately or places it in a queue for later execution, when predetermined conditions are met.

If the request is to be executed immediately, the workload query (delay) manager 610 places the requests in buckets $620_{a...s}$ corresponding to the priority classes to which the requests were assigned by the administrator 405. A request processor function performed under control of a priority scheduler facility (PSF) 625 selects queries from the priority class buckets $620_{a...s}$, in an order determined by the priority associated with each of the buckets $620_{a...s}$, and executes it, as represented by the processing block 630 on FIG. 6.

The PSF 625 also monitors the request processing and reports throughput information, for example, for each request and for each workgroup, to the exception monitor 615. Also included is a system condition monitor 635, which is provided to detect system conditions, such as errors, problems and failures that occur during the execution of query execution plans. The system condition monitor 635 provides the ability to dynamically monitor and regulate the DBS 100 globally. The exception monitor 615 and system monitor 635 collectively define an exception attribute monitor 640.

The exception monitor 615 compares the throughput with the workload rules 409 and stores any exceptions (e.g., throughput deviations from the workload rules) in the exception log/queue 510. In addition, the exception monitor 615 provides system resource allocation adjustments to the PSF 625, which adjusts system resource allocation accordingly, e.g., by adjusting the priority scheduler weights. Further, the exception monitor 615 provides data regarding the workgroup performance against workload rules to the workload query (delay) manager 610, which uses the data to determine whether to delay incoming requests, depending on the workload group to which the request is assigned.

As can be seen in FIG. 6, the system provides a plurality of feedback loops. A first feedback loop includes the PSF 625 and the exception monitor 615. In this first feedback loop, the system monitors, on a short-term basis, the execution of requests to detect deviations greater than a short-term threshold from the defined service level for the workload group to which the requests were defined. If such deviations are detected, the DBS 100 is adjusted, e.g., by adjusting the assignment of system resources to workload groups.

A second feedback loop includes the workload query (delay) manager 610, the PSF 625 and the exception monitor 615. In this second feedback loop, the DBS 100 monitors, on a long-term basis, to detect deviations from the expected level of service greater than a long-term threshold. If it does, the DBS 100 adjusts the execution of requests, e.g., by delaying, swapping out or aborting requests, to better provide the expected level of service.

Automatic Error Recovery

In one embodiment, the DBS 100 implements an automatic error recovery mechanism using the administrator 405, monitor 410 and regulator 415 working together, in an attempt to address errors, problems or failures that occur during the processing of queries in the DBS 100, especially where those errors, problems or failures cause the DBS 100 to cancel execution of the query.

Specifically, a workaround may be available in the DBS 100 (i.e., by deactivating and/or activating components, features or code paths), that can be manually implemented on the DBS 100 through the intervention of a user, DBA or other personnel, or that can be automatically implemented by the DBS 100 without the intervention of a user, DBA or other personnel. Such workarounds can remain in place for long periods of time, even across several releases or updates to the DBS 100, thus allowing the DBS 100 to provide for better execution of query plans, namely execution without errors, problems or failures. Moreover, workarounds can be manually or automatically disabled in the DBS 100 (i.e., by activating and/or deactivating components, features or code paths), once a "fix" is implemented in the DBS 100, thereby avoiding having the workarounds implemented for long periods of time.

Specifically, components, features and code paths of the DBS 100 can be manually or automatically deactivated and/or activated through the analysis of diagnostics, which may result in the errors, problems and failures being avoided. The query can be resubmitted for execution, but using a different set of components, features or code paths of the DBS 100 than the set of components, features or code paths that resulted in the errors, problems and failures. Moreover, users, DBAs and other personnel, including vendor personnel, can be alerted to the errors, problems and failures.

Often, these errors, problems and failures results from PE 130 errors, such as Parser 205 or Optimizer 320 errors. A large number of PE 130 errors, such as lack of memory and/or other internal failures, may cause the PE 130 to cancel execution of the query execution plan. However, the PE 130 has a large number of options that can be automatically deactivated and/or activated through the use of diagnostics, which may result in the errors, problems and failures being bypassed. The present invention enhances TASM Workload Management with the ability to identify a scenario where a query execution plan can be resubmitted using a different set of components, features or code paths. In other words, a query execution plan can be re-submitted without invoking the components, features and code paths that resulted in the errors, problems or failures.

For example, assume that an error is discovered in the code path of the Hash Join algorithm performed by the Optimizer 320 that causes an out-of-memory condition. Diagnostic codes can instruct the Optimizer 320 to disable the code path of the Hash Join algorithm until a fix can be installed on the system, thereby allowing the user's query to execute without causing the error, at the cost of eliminating optimization for that portion of the query. In this way, the present invention allows the DBS 100 to detect and disable and/or enable certain components, features and code paths, without causing a major disruption to the operation of the DBS 100.

In the present invention, the PE 130 is instrumented in such a way that when execution of a first set of components, features or code paths is initiated by a query execution plan, it pushes a Unique Identifying Code (UIC) onto an Autonomic Error Recovery Stack (AERS) stored in memory. When execution of the first set of components, features or code paths is completed successfully, it pops the UIC from the AERS.

However, should errors, problems or failures occur during the execution of the first set of components, features or code paths, the UIC is at the top of the AERS when an error handler is invoked by the PE 130. In addition, the errors, problems or failures that occurred during the execution of the first set of components, features or code paths will have generated an associated error code.

The error handler accesses a table stored in the data storage facilities 120, which in one embodiment is named DBC.AE-RCodes, that contains all UICs, their associated error codes, diagnostic codes, optional parameters for the diagnostic codes, and retry order. Workload classification rules can also include a retry order, so that a dynamic limit for retry attempts can be specified.

The error handler performs a lookup into the DBC.AER-Codes table using the UIC and the error code in order to retrieve one or more matching rows containing, in addition to the UIC and the error code, the diagnostic codes, optional parameters and retry order. Upon successfully retrieving one or more matching rows, the error hander performs the following steps or functions:

(a) Sort the matching rows by their retry order, and select one or more of the matching rows with a retry order based on the current RAN. As noted above, a retry attempt number (RAN) for the query execution plan is initialized to 0 when the query is executed for the first time. The RAN is used to determine the number of times the query execution plan is retried, before the query execution plan is flagged as failing.

(b) Use a set of heuristics that take into account the current work load and the classification rules related to this specific query to determine the maximum number of attempts (MNA) to re-submit the query execution plan.

(c) Instruct the Dispatcher function 210 to resubmit or restart the query execution plan with the diagnostic codes and optional parameters from the selected matching row. The diagnostic codes and optional parameters instruct the PE 130 to implement a workaround, which is expected to avoid the errors, problems or failures that occurred. In this regard, the diagnostic codes and optional parameters may deactivate the first set of components, features or code paths and/or activate a second set of components, features or code paths.

Note that, in the present invention, each retry attempt may be executed with a different set of diagnostic commands and optional parameters that instruct the PE 130 to implement different workarounds, i.e., that deactivate and/or activate different components, features or code paths, in an attempt to avoid the errors, problems and failures.

Note also that. before a query execution plan is resubmitted, it is marked as such, and the RAN for the query execution plan is incremented. When the error handler determines that the RAN is greater than the MNA, the error handler does not resubmit the query execution plan, but instead flags the query execution plan as completed (and failed).

In addition, it is anticipated that, each time that the query execution plan fails, all information related to the errors, problems and failures, as well as the UICs, error codes, diagnostic codes and optional parameters, may be sent to the vendor for further investigation of the causes. It is possible to have multiple causes, especially when there have been retry multiple attempts using different diagnostic codes and optional parameters.

The main advantage of the present invention is that it automatically reduces the number of requests that cannot be performed by the DBS 100 due to PE 130 faults, such as low memory, bugs, etc. The PE 130 has a large number of diagnostics that enable a large number of opportunities to dynamically perform query requests without causing crashes, faults, etc., in the PE 130. In other words, the present invention can dynamically provide a workaround until a fix can be applied to the DBS 100. With the present invention, substantial time is saved and features are not deactivated for long periods of time, thus allowing for customers to keep using most of the components, features and code paths available in the DBS 100. In addition, it means that the PE 130 fails with less frequency.

Logic of the Preferred Embodiment

Figure 7A:
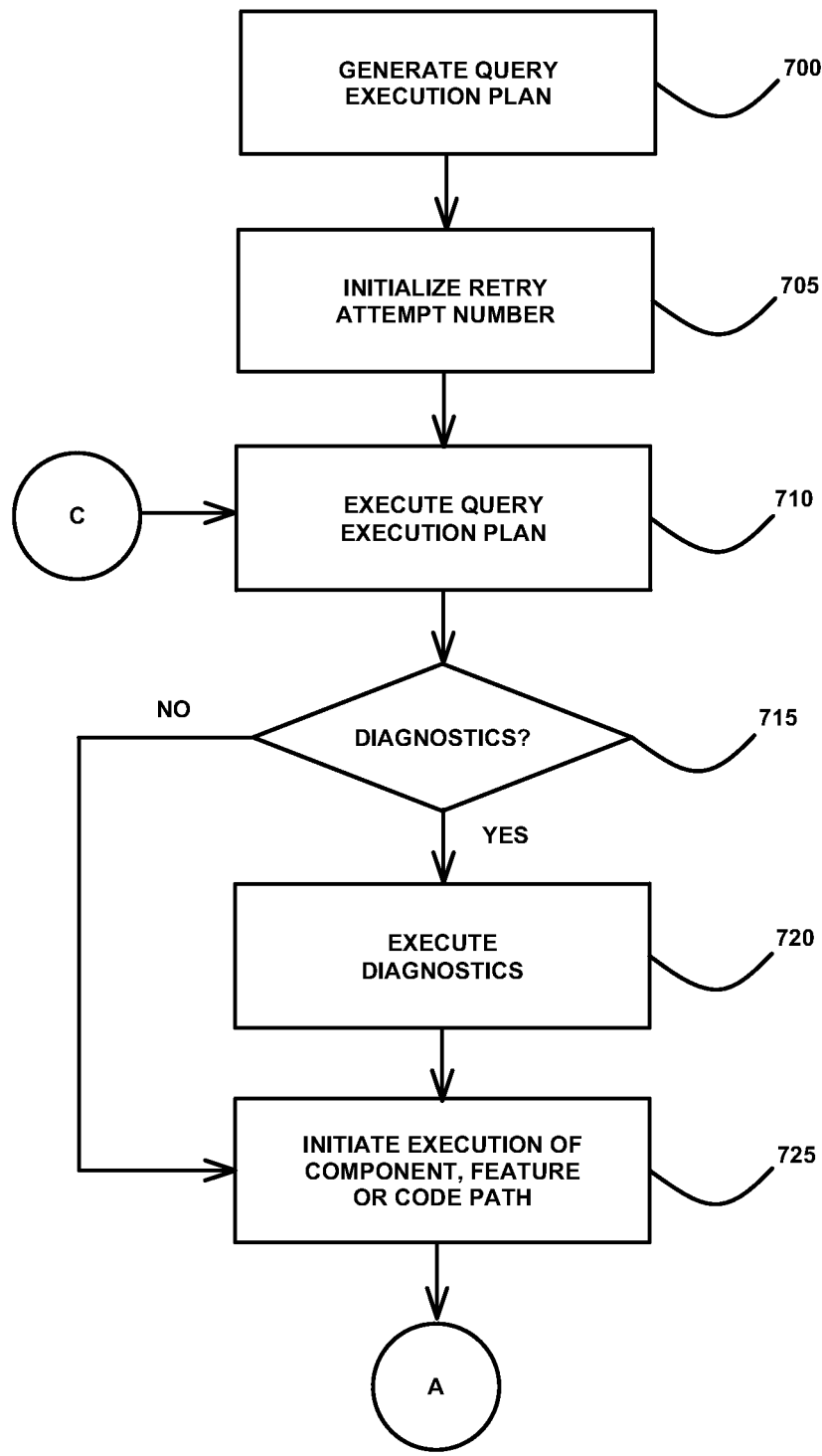
FIGS. 7a, 7b and 7c together are a flowchart of the automatic error recovery mechanism.
Figure 7B:
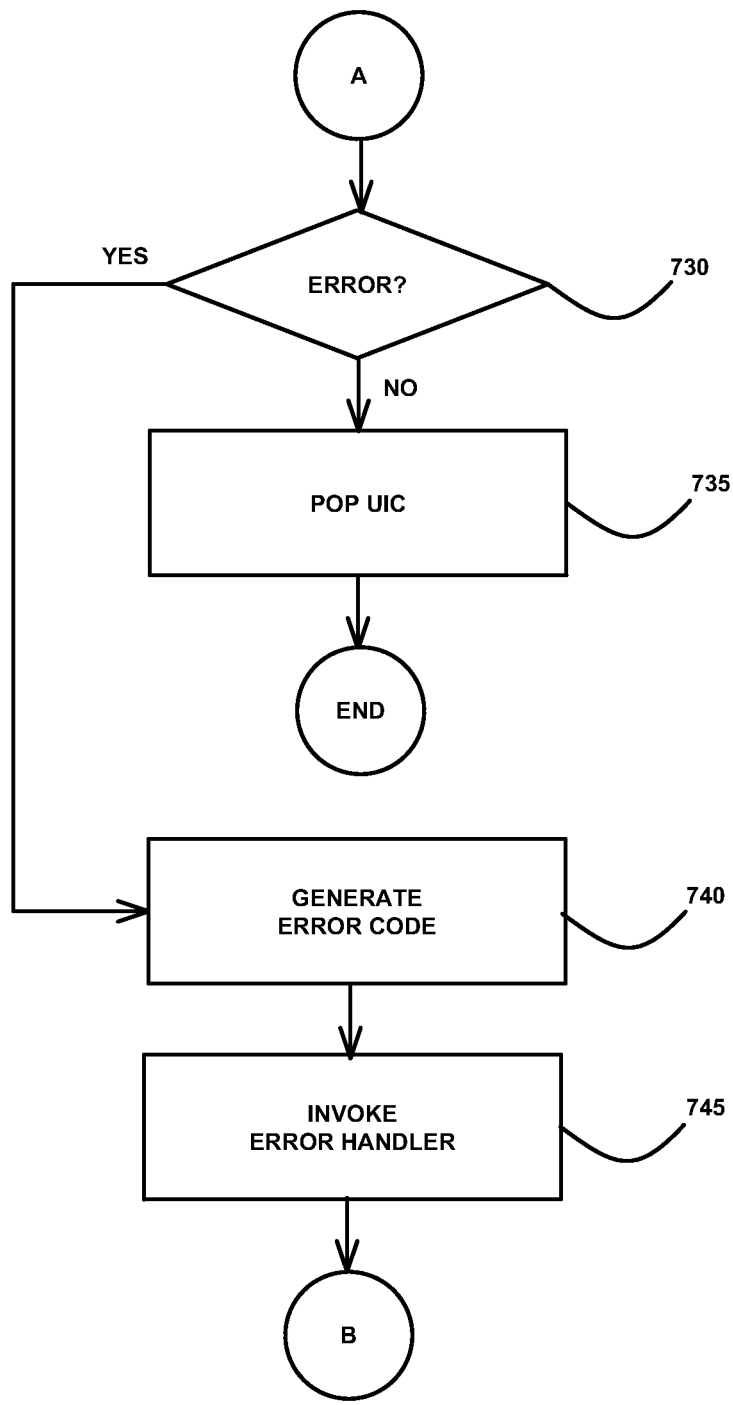
Figure 7C:
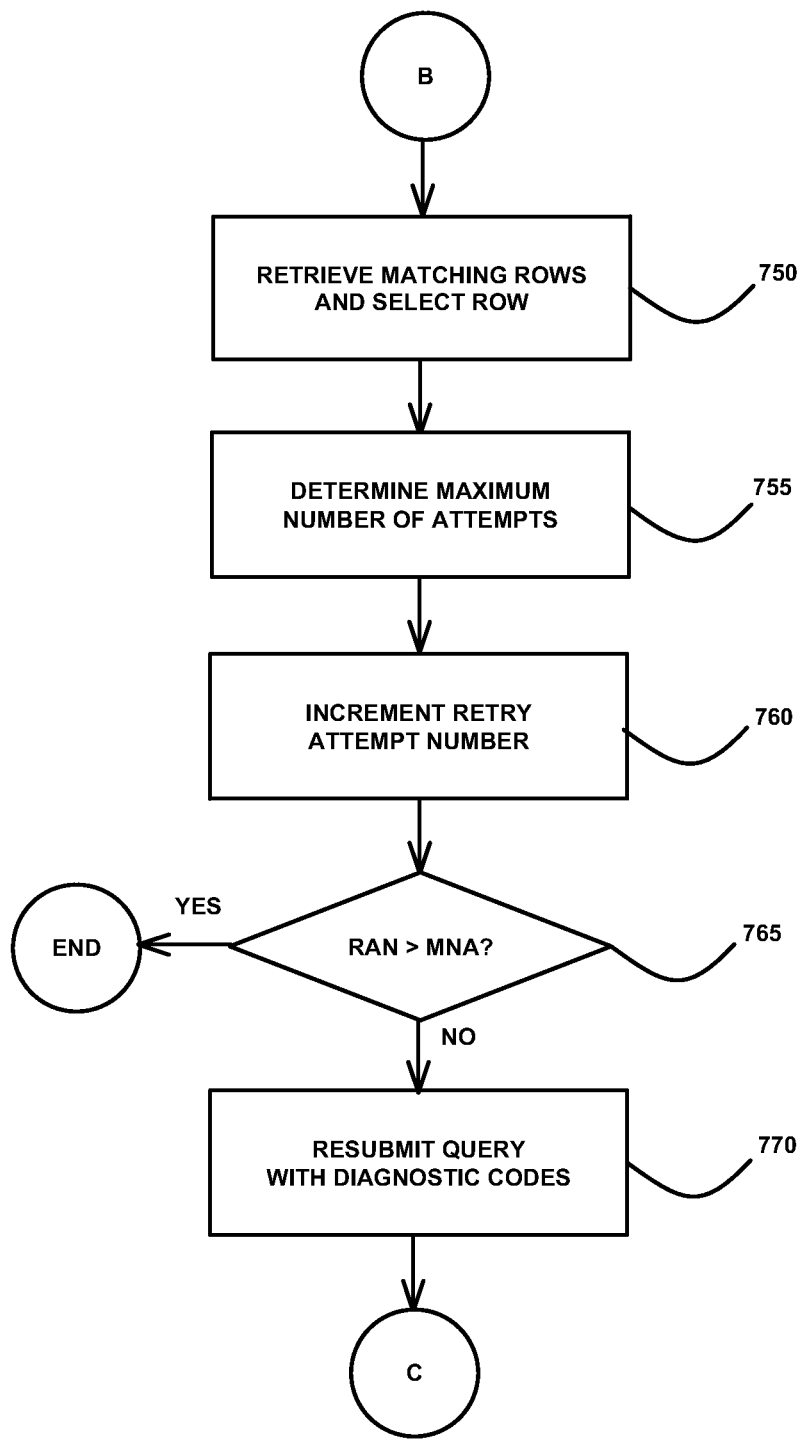

FIGS. 7*a*, 7*b* and 7*c* together form a flowchart that further illustrates the logic performed according to the preferred embodiment of the present invention. Specifically, FIGS. 7*a*, 7*b* and 7*c* together illustrate the automatic error recovery steps and functions performed by the DBS 100 during the execution of database queries, as described above.

Block 700 represents the DBS 100 generating a query execution plan for a request, wherein the query execution plan accesses data from a database stored on the DBS 100.

Blocks 705-770 generally represent the DBS 100 executing the query execution plan to access the data in the database, wherein automatic error recovery is performed for the query execution plan, following errors, problems or failures that occur during execution of the query execution plan, by deactivating or activating components, features or code paths in the computer system, and then re-submitting the query execution plan for execution in the computer system. The specifics of these steps are described below.

Block 705 represents the DBS 100 initializing a retry attempt number (RAN) for the request, upon the first attempt to execute the query execution plan. The RAN is used to determine how many times the query execution plan is retried, before being flagged as failed.

Block 710 represents the DBS 100 initiating the execution of the query execution plan.

Block 715 is decision block the represents the DBS 100 determining whether diagnostic codes, and their optional parameters, accompany the query execution plan. The diagnostics codes may have been automatically or manually included with the query execution plan. If so, control transfers to Block 720; otherwise, control transfers to Block 725.

Block 720 represents the DBS 100 initiating execution of the diagnostics codes, including their optional parameters. The diagnostics codes may manually or automatically deactivate, activate and/or re-activate components, features or code paths in the DBS 100.

Block 725 represents the DBS 100 executing one or more components, features or code paths for the query execution plan. Note that this Block may represent the deactivation of a first set of components, features or code paths in the DBS 100 and/or the activation of a second set of (alternative) components, features or code paths in the DBS 100. Note also that this Block includes a Unique Identifying Code (UIC) being pushed onto an Autonomic Error Recovery Stack (AERS) stored in the memory of the DBS 100.

Block 730 is decision block the represents the DBS 100 determining whether any errors, problems or failures occurred during the execution of the components, features or code paths in Block 725. If not, control transfers to Block 735; otherwise, control transfers to Block 740.

Block 735 represents the DBS 100 popping the UIC from the AERS, when the execution of the components, features or code paths for the query execution plan has completed successfully. Thereafter, the logic terminates, as the query request has been completed successfully, and no automatic error recovery mechanism is performed.

Block 740 represents the DBS 100 generating an error code, when the execution of the components, features or code paths in the DBS 100 for the query execution plan results in errors, problems or failures.

Block 745 represents the DBS 100 (optionally) invoking an automatic error recovery mechanism following an analysis of diagnostics generated by the DBS 100 as a result of the errors, problems or failures. Specifically, this Block may represent the PE 130 invoking an error handler to process the UIC and error code as described below. This Block may also alert users, DBAs or other personnel, including vendor personnel, to the errors, problems or failures resulting from the execution of the query execution plan.

Block 750 represents the error handler accessing the table stored in the data storage facilities 120 that contains all UICs, their associated error codes, diagnostic codes, optional parameters for the diagnostic codes, and retry order. Specifically, the error handler performs a lookup into the table using the UIC and the error code in order to retrieve one or more matching rows containing, in addition to the UIC and the error code, the diagnostic codes, optional parameters and retry order. Upon successfully retrieving one or more matching rows, Block 750 also represents the error handler sorting the matching rows by their retry order, and then selecting one or more of the matching rows with retry orders based on the current RAN.

Block 755 represents the DBS 100, using a set of heuristics that take into account the current work load and the classification rules related to this specific query, determining a maximum number of attempts (MNA) to re-submit the query execution plan.

Block 760 represents the DBS 100 incrementing the retry attempt number (RAN) for the query execution plan.

Block 765 is decision block that represents the DBS 100 determining whether the retry attempt number (RAN) is greater than the maximum number of attempts (MNA). If not, control transfers to Block 770; otherwise, the logic terminates, as the query request has been completed unsuccessfully and the query execution plan is flagged as failed.

Block 770 represents the DBS 100 re-submitting the query execution plan with the diagnostic codes and optional parameters from the selected matching rows. Thereafter, control is transferred back to Block 710 to re-execute the query execution plan using the diagnostic codes and optional parameters. The diagnostic codes and optional parameters instruct the PE 130 to implement a workaround, which is expected to avoid the errors, problems or failures that occurred. In this regard, as noted above, the diagnostic codes and optional parameters may deactivate a first set of components, features or code paths, and/or activate a second set of components, features or code paths.

CONCLUSION

Thus, the present invention provides a number of advantages over the prior art. First, the present invention maximizes the overall effectiveness of query execution. Moreover, the present invention minimizes the amount of down-time resulting from errors in the execution of queries. Finally, the present invention leverages and co-exists with existing solutions to solve the problem at hand.

Consequently, the present invention provides a major step forward in improving the quality of query execution. In addition, the present invention provides greater run-time and real-time awareness in errors, problems and failures during query execution as compared to prior art query execution techniques.

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for error recovery during execution of database queries in a computer system, comprising:
generating, in the computer system, a query execution plan for a request, wherein the query execution plan accesses data from a database stored on the computer system;
executing, in the computer system, the query execution plan to access the data in the database;
detecting occurrence of an error, a problem or a failure in the execution of the query execution plan:
in response to the detection of the error, problem, or failure, identifying a plurality of workarounds to avoid the detected occurrence of the error, problem, or failure, wherein each workaround includes deactivating or activating components, features or code paths of the query execution plan, and wherein each workaround has an associated predetermined ranking with respect to one another;
determining a maximum number of retry attempts based on a current workload of the computer system and at least one classification rule associated with the query execution plan;
revising the query execution plan according to a workaround having a highest predetermined ranking;
submitting the revised query execution plan for execution in the computer system; and
repeating the revising and submitting of the query execution plan for each detected occurrence of the error, problem or occurrence associated with execution of a revision of the revised query execution plan until execution of the revised query execution plan is completed or until the maximum number of retry attempts is reached, wherein each revision of the revised query execution plan is based on a different workaround in an order of highest to lowest predetermined ranking.

2. The method of claim 1, wherein the components, features or code paths of the query execution plan in the computer system are automatically deactivated or activated.

3. The method of claim 1, wherein the components, features or code paths of the query execution plan in the computer system are manually deactivated or activated.

4. The method of claim 1, wherein the method further comprises generating an alert to the detected occurrence of the error, problem or failure that causes the query execution plan to stop executing.

5. The method of claim 1, wherein revising the query execution plan is performed following an analysis of diagnostics generated by the computer system.

6. The method of claim 1, wherein:
execution of the components, features or code paths of the query execution plan is initiated by initial execution of the query execution plan;
a Unique Identifying Code (UIC) is pushed onto an Autonomic Error Recovery Stack (AERS) stored in memory in response to the initial execution of the query execution plan; and
a retry attempt number (RAN) is initialized, wherein the RAN is used to determine how many times the query execution plan is retried, before the query execution plan is flagged as failed.

7. The method of claim 6, wherein the UIC is popped from the AERS when the execution of the components, features or code paths of the query execution plan is completed successfully.

8. The method of claim 6, wherein an error code is generated in response to the detected occurrence of an error, a problem, or a failure in the execution of the query execution plan, and an error handler is invoked to:
    access a table to retrieve one or more matching rows that contain the UIC and the error code, wherein the matching rows also contain diagnostic codes, optional parameters for the diagnostic codes, and a retry order;
    select one or more of the matching rows with a retry order based on the RAN;
    determine a maximum number of attempts (MNA) to submit the revised query execution plan;
    increment the RAN; and
    submit the revised query execution plan with the diagnostic codes and optional parameters from the selected matching row, wherein the diagnostic codes and optional parameters deactivate the components, features or code paths, or activate other components, features or code paths in the revised query execution plan.

9. The method of claim 8, wherein each of the matching rows includes a different set of diagnostic commands and optional parameters that deactivate the components, features or code paths, or activate other components, features or code paths, in an attempt to avoid the error, problem, or failure of the detected occurrence.

10. The method of claim 8, wherein the revised query execution plan is not submitted when the RAN is greater than the MNA.

11. A system comprising:
    at least one processor configured to:
    generate a query execution plan for a request, wherein the query execution plan accesses data from a database stored on a storage device;
    execute the query execution plan to access the data in the database;
    detect occurrence of an error, a problem or a failure in the execution of the query execution plan;
    in response to the detection of the error, problem, or failure identify a plurality of workarounds to avoid the detected occurrence of the error, problem, or failure, wherein each workaround includes deactivation or activation of components, features or code paths of the query execution plan, and wherein each workaround has an associated predetermined ranking with respect to one another;
    determine a maximum number of retry attempts based on a current workload of the at least one processor and at least one classification rule associated with the query execution plan;
    revise the query execution plan according to a workaround having a highest predetermined ranking;
    submit the revised query execution plan; and
    repeat the revision and submission of the query execution plan for each detected occurrence of the error, problem or occurrence associated with execution of a revision of the revised query execution plan until execution of the revised query execution plan is completed or until the maximum number of retry attempts is reached, wherein each revision of the revised query execution plan is based on a different workaround in an order of highest to lowest predetermined ranking.

12. The system of claim 11, wherein the components, features or code paths are automatically deactivated or activated.

13. The system of claim 11, wherein the components, features or code paths are manually deactivated or activated.

14. The system of claim 11, wherein the at least one processor is further configured to generate alerts to the detected occurrence of an error, a problem or a failure that causes the query execution plan to stop executing.

15. The apparatus of claim 11, wherein the at least one processor is further configured to revise the query execution plan following an analysis of diagnostics generated.

16. The system of claim 11, wherein:
    execution of the components, features or code paths by the at least one processor is initiated by the execution of the query execution plan, and wherein the at least one processor is further configured to:
    push a Unique Identifying Code (UIC) onto an Autonomic Error Recovery Stack (AERS) stored in memory in response to initial execution of the query execution plan; and
    initialize a retry attempt number (RAN), wherein the RAN is used to determine how many times the query execution plan is retried, before the query execution plan is flagged as failed.

17. The system of claim 16, wherein the at least one processor is further configured to pop the UIC from the AERS when the execution of the components, features or code paths is completed successfully.

18. The system of claim 16, wherein the at least one processor is further configured to:
    generate an error code when the execution of the components, features or code paths results in the errors, problems or failures in response to the detected occurrence of an error, a problem or a failure in the execution of the query execution plan; and
    execute an error handler to:
    access a table to retrieve one or more matching rows that contain the UIC and the error code, wherein the matching rows also contain diagnostic codes, optional parameters for the diagnostic codes, and a retry order;
    select one or more of the matching rows with a retry order based on the RAN;
    determine a maximum number of attempts (MNA) to submit the revised query execution plan;
    increment the RAN; and
    submit the query execution plan with the diagnostic codes and optional parameters from the selected matching row, wherein the diagnostic codes and optional parameters deactivate the components, features or code paths, or activate other components, features or code paths.

19. The system of claim 18, wherein each of the matching rows includes a different set of diagnostic commands and optional parameters that deactivate the components, features or code paths, or activate other components, features or code paths, in an attempt to avoid the error, problem, or failure of the detected occurrence.

20. The system of claim 18, wherein the revised query execution plan is submitted when the RAN is greater than the MNA.

21. An article of manufacture comprising one or more storage devices tangibly embodying instructions that, when executed by a computer system, result in the computer system performing a method for error recovery during execution of database queries in the computer system, the method comprising:
    generating, in the computer system, a query execution plan for a request, wherein the query execution plan accesses data from a database stored on the computer system;

executing, in the computer system, the query execution plan to access the data in the database;

detecting occurrence of an error, a problem, or a failure in the execution of the query execution plan;

in response to the detection of the error, problem, or failure, identifying a plurality of workarounds to avoid the detected occurrence of an error, a problem, or a failure, wherein each workaround includes deactivating or activating components, features or code paths of the query execution plan, and wherein each workaround has an associated predetermined ranking with respect to one another;

determining a maximum number of retry attempts based on a current workload of the computer system and at least one classification rule associated with the query execution plan;

revising the query execution plan according to a workaround having a highest predetermined ranking;

submitting the revised query execution plan for execution in the computer system; and repeating the revising and submitting of the query execution plan for each detected occurrence of the error, problem or occurrence associated with execution of a revision of the revised query execution plan until execution of the revised query execution plan is completed or until the maximum number of retry attempts is reached, wherein each revision of the revised query execution plan is based on a different workaround in an order of highest to lowest predetermined ranking.

22. The article of claim 21, wherein the components, features or code paths are automatically deactivated or activated.

23. The article of claim 21, wherein the components, features or code paths are manually deactivated or activated.

24. The article of claim 21, wherein the method further comprises generating an alert to the detected occurrence of an error, a problem, or failure that causes the query execution plan to stop executing.

25. The article of claim 21, wherein revising the query execution plan is performed following an analysis of diagnostics generated by the computer system.

26. The article of claim 21, wherein:

execution of the components, features or code paths is initiated by initial execution of the query execution plan;

a Unique Identifying Code (UIC) is pushed onto an Autonomic Error Recovery Stack (AERS) stored in memory in response to the initial execution of the query execution plan; and a retry attempt number (RAN) is initialized, wherein the RAN is used to determine how many times the query execution plan is retried, before the query execution plan is flagged as failed.

27. The article of claim 26, wherein the method further comprises popping the UIC from the AERS when the execution of the components, features or code paths is completed successfully.

28. The article of claim 26, wherein an error code is generated in response to the detected occurrence of an error, a problem, or a failure in the execution of the query execution plan, and an error handler is invoked to:

access a table to retrieve one or more matching rows that contain the UIC and the error code, wherein the matching rows also contain diagnostic codes, optional parameters for the diagnostic codes, and a retry order;

select one or more of the matching rows with a retry order based on the RAN;

determine a maximum number of attempts (MNA) to submit the revised query execution plan;

increment the RAN; and submit the revised query execution plan with the diagnostic codes and optional parameters from the selected matching row, wherein the diagnostic codes and optional parameters deactivate the components, features or code paths, or activate other components, features or code paths.

29. The article of claim 28, wherein each of the matching rows includes a different set of diagnostic commands and optional parameters that deactivate the components, features or code paths, or activate other components, features or code paths, in an attempt to avoid the error, problem, or failure of the detected occurrence.

30. The article of claim 28, wherein the revised query execution plan is not submitted when the RAN is greater than the MNA.

* * * * *